May 8, 1951 A. R. FULTZ 2,552,272
VERTICAL ILLUMINATOR FOR OPTICAL PROJECTION COMPARATOR
WITH RELAY TYPE OPTICAL SYSTEM
Filed Dec. 9, 1948 3 Sheets-Sheet 1

ALLEN R. FULTZ
INVENTOR
BY
ATTORNEYS

May 8, 1951 A. R. FULTZ 2,552,272
VERTICAL ILLUMINATOR FOR OPTICAL PROJECTION COMPARATOR
WITH RELAY TYPE OPTICAL SYSTEM
Filed Dec. 9, 1948 3 Sheets-Sheet 2

ALLEN R. FULTZ
INVENTOR
BY
ATTORNEYS

May 8, 1951          A. R. FULTZ          2,552,272
VERTICAL ILLUMINATOR FOR OPTICAL PROJECTION COMPARATOR
WITH RELAY TYPE OPTICAL SYSTEM

Filed Dec. 9, 1948          3 Sheets-Sheet 3

ALLEN R. FULTZ
INVENTOR

BY *Newton M Perkins*
*F. M. Emerson Holmes*
ATTORNEYS

Patented May 8, 1951

2,552,272

UNITED STATES PATENT OFFICE 2,552,272

VERTICAL ILLUMINATOR FOR OPTICAL PROJECTION COMPARATOR WITH RELAY TYPE OPTICAL SYSTEM

Allen R. Fultz, Rochester, N. Y., assignor to Eastman Kodak Company, Rochester, N. Y., a corporation of New Jersey Application December 9, 1948, Serial No. 64,368

3 Claims. (Cl. 88—24)

This invention relates to profile projectors and optical comparators. The preferred embodiments thereof constitute improvements of the optical system described in patent application Serial Number 64,404 filed concurrently herewith by Turner and Kingslake. Furthermore, the invention may be combined with that described in patent application Serial Number 64,406 also filed concurrently herewith by Hudak to give episcopic illumination of the underside of an object laid on a transparent horizontal table.

The main object of the present invention is to provide an optical comparator which permits the object to be tested to be laid on a horizontal table and to be illuminated vertically from above. At the same time, the image thereof is projected to a vertical screen for convenient viewing, immediately above the test object.

It is particularly an object of the invention to provide an optical system which can be incorporated as a simple attachment on the comparator described in the Turner and Kingslake, and Hudak applications mentioned above.

Other objects and advantages of the invention will be apparent from the following description when read in connection with the accompanying drawings in which.

Figure 4:
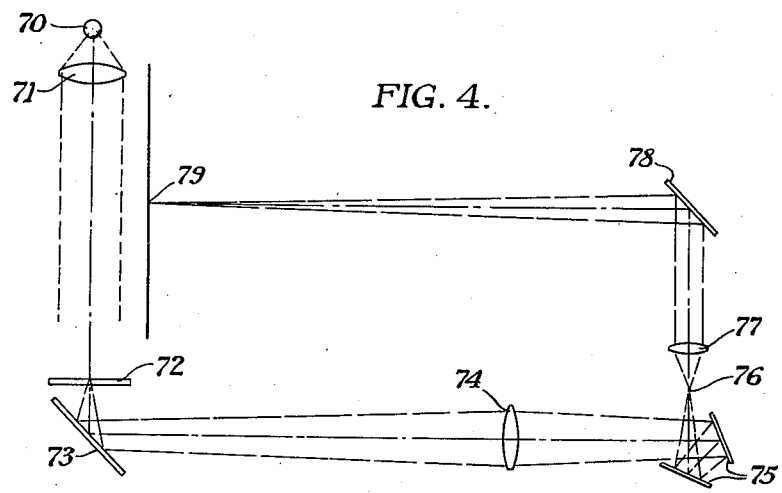
Figure 5:
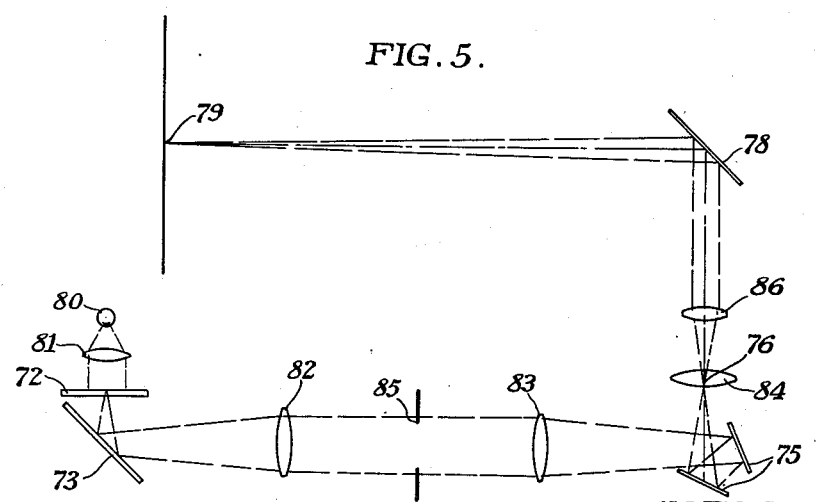

Figs. 4 and 5 similarly show alternative optical systems incorporating the invention.

Figure 1:
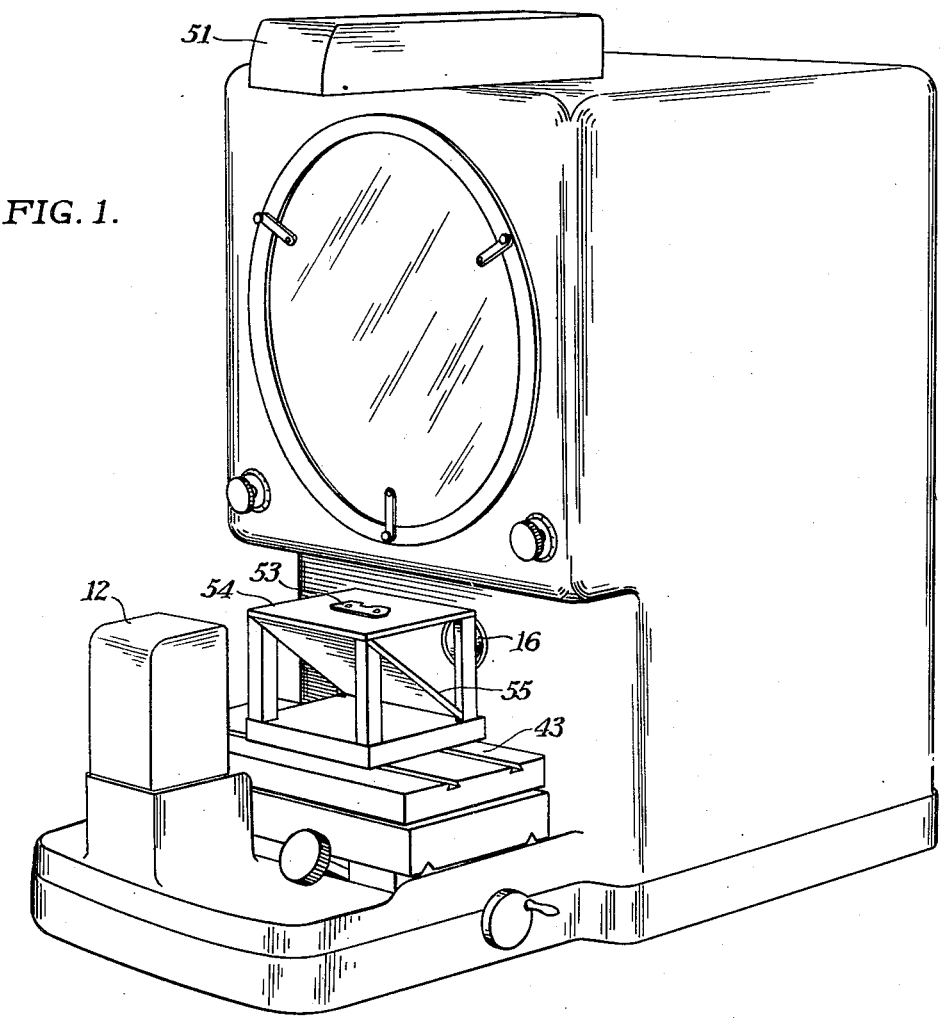
Fig. 1 is a perspective view of an optical comparator incorporating the present invention.
Figure 2:
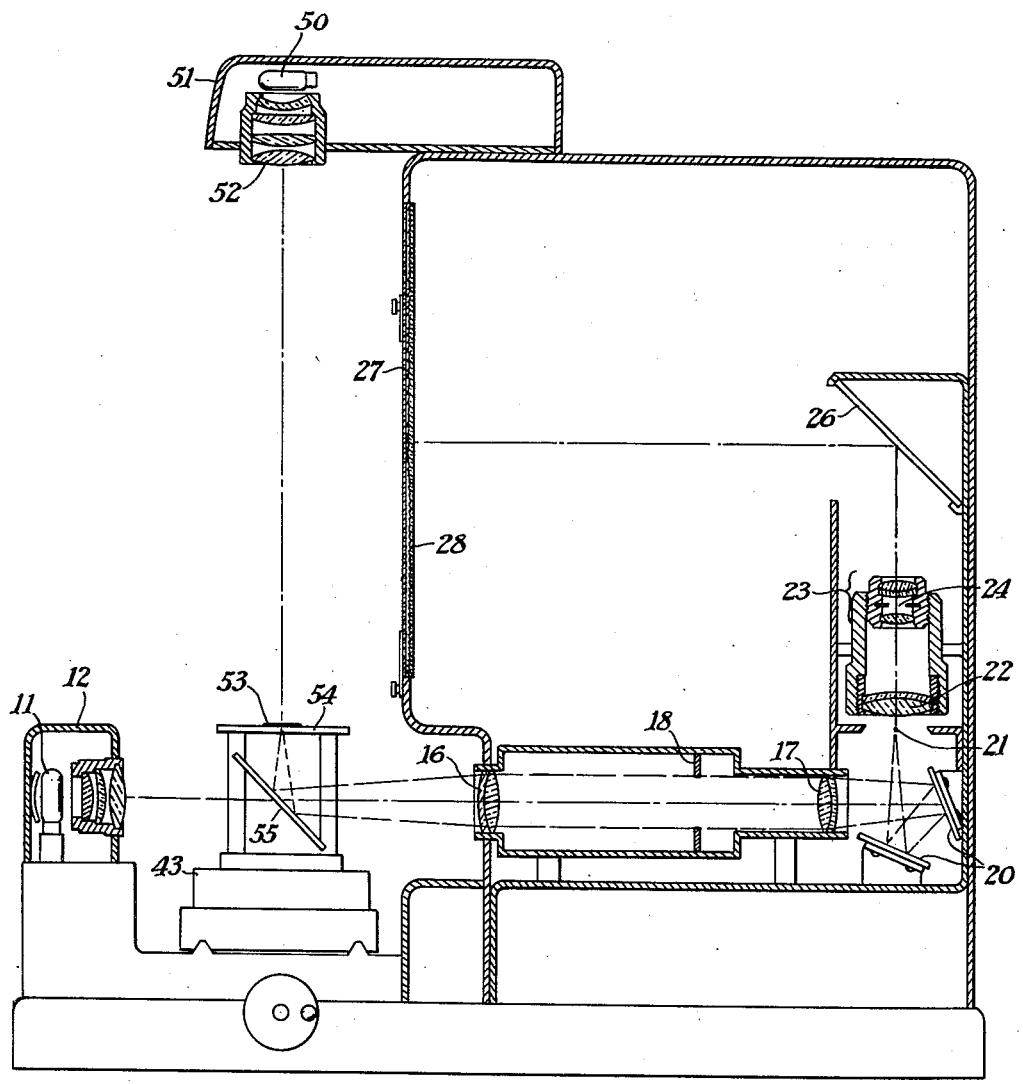
Fig. 2 is a side elevation partly in section of the comparator shown in Fig. 1.

The embodiment shown in Figs. 1 and 2 is in the form of an attachment for the comparator described in the Kingslake and Turner, and Hudak applications. When this attachment is used, the lamp 11 in the lamphouse 12 is not turned on. Instead light from a lamp 50 in a lamphouse 51 is collimated by a condenser 52 and passes vertically downward to illuminate the profile of an object 53 lying on a transparent table 54. Light from the object 53 is reflected horizontally by a mirror 55 to a lens 16. The transparent table 54 and the mirror 55 are supported by a suitable fixture which merely rests on the adjustable work holder 43 of the standard comparator. Light from the work piece is focused by an afocal system consisting of lenses 16 and 17 to form an aerial image 21, after reflection by a pentareflector 20. The lenses 16 and 17 have equal focal lengths and are separated by the sum of their focal lengths with the effective stop 18 located in the mutual focal plane of the two lenses 16 and 17. This arrangement renders the system telecentric in both directions so that all portions of the object 53 whether in focus or not are equally magnified and in the particular embodiment shown the image at the point 21 can be compared with a standard reticle even if the standard is not accurately located in the plane of the image 21. Since the lenses 16 and 17 are of equal power, the image 21 has unit magnification. The afocal system may be moved along the optic axis either toward or away from the mirror 55, without affecting either the location or magnification of the image 21. This is a property of afocal systems. However, in order to maintain the maximum relative aperture and complete correction of distortion, coma and lateral color it is preferable to have the afocal system symmetrically located between the object 53 and the image 21. That is, the optical distance from 53 to 16 should equal the optical distance from 17 to 21.

A field lens 22 located substantially at the image plane 21 focuses the stop 18, or more exactly, the image thereof into the internal stop 24 of an ordinary objective 23. In some systems, maximum correction of aberrations requires the field lens 22 to be right at or so close to the image plane 21 that the comparison reticle feature must be omitted but it is of minor importance anyway. The objective 23 relays the image from the point 21 via a reflecting surface 26 and forms a greatly enlarged image thereof on a rear projection screen 27. Since one of the purposes of the present invention is to obtain high magnification in a small instrument, the objective 23 covers a relatively wide angle which normally would tend to introduce uneven brightness of the image on the screen 27 as viewed from the front. To overcome this, a Fresnel lens 28 is positioned immediately behind the screen 27 to act as a field lens for the image formed on this screen. It will be noted that the working distance between the object 53 and the lens 16 depends only on the focal length of the lens 16, whereas the magnification of the system depends only on the focal length of the lens 23. Thus large working distance and high magnification in short overall length are obtained by selecting a large focal length for lens 16 and a small focal length for the lens 23.

Figure 3:
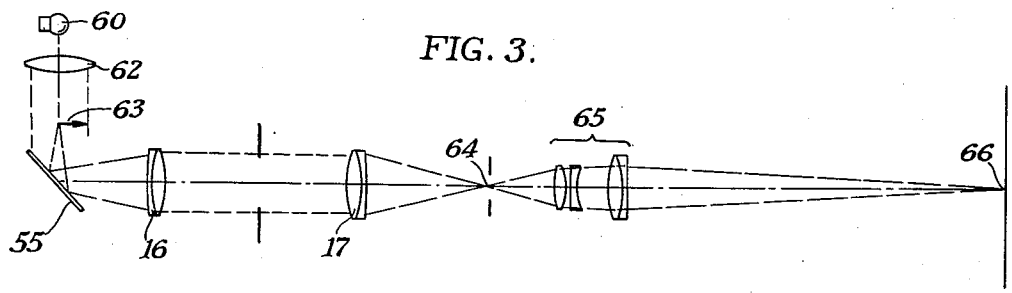
Fig. 3 shows the optical system of said comparator omitting certain reflectors.

In Fig. 3 a similar optical system is shown schematically in which light from a lamp 60 through a condenser 62 illuminates a horizontal object 63 shown conventionally as an arrow. Light from the object 63 is reflected by a mirror 55 through the afocal system consisting of lenses 16 and 17 to form an aerial image at the point 64. This aerial image is relayed by a telecentric lens system 65 to form an image on a screen at the point 66. Thus the present system is applicable to any type of relay optical system for comparators. This point is further illustrated by Figs. 4 and 5.

In Fig. 4 light from a lamp 70 through a condenser 71 illuminates the work table 72. Light from an object thereon is reflected by a mirror 73 through a single objective 74, via a penta reflector 75 to form a horizontal image at the point 76. This aerial image is relayed by a lens 77 and a morror 78 to a vertical screen at the point 79 which is above the work table 72 and immediately behind the beam of light passing vertically downward from the condenser 71 to the work table 72.

Fig. 5 on the other hand has a light source 80 and condenser 81 below the screen 79. The work table 72 is similarly illuminated, but the image formed at the point 76 is produced by an afocal system consisting of lenses 82 and 83 separated by the sum of their focal lengths. A field lens 84 substantially at the image 76 focuses the stop 85 of the afocal system into a relay objective 86 which via the mirror 78 forms the image on the screen 79. The screen is again above the work table 72 and in this case the light source is at a level between the work table and the screen. The arrangement shown in Fig. 4 is preferable however, since it allows more working distance. It is noted that manipulation of the screen 79 or of any charts placed thereon may be conveniently carried out without necessarily interfering with the light beam passing vertically downward in front thereof, because the beam is relatively narrow and the sides of the screen may be easily reached by the hands of the operator.

What I claim and desire to secure by Letters Patent of the United States:

1. An optical system for an optical comparator comprising a horizontal, transparent work holder, means located above the work holder for directing light vertically downward to illuminate a work piece positioned on the work holder, a plane reflecting means below the work holder for receiving light therefrom and for directing it horizontally, a first objective system with its optic axis horizontally positioned to receive the light from the reflecting means and to form an aerial image of the work piece, reflecting means positioned to receive light from the first objective means and to reflect it vertically upward, a vertical, rear projection screen above and behind the work holder, a second objective system with its optic axis vertically and optically aligned to receive light from the aerial image and to project a relayed image thereof, a reflecting means above the second objective means for reflecting light therefrom onto the screen in focus, the reflecting means between the first objective system and the second and the reflecting means between the second objective system and the screen consisting in total of three reflecting surfaces.

2. An optical system for an optical comparator comprising a work holder, means for illuminating a work piece positioned on the work holder, a first objective lens system for receiving light from the work piece and for forming an aerial image thereof, a rear projection viewing screen and a second objective lens system aligned to receive light from the aerial image and to project a relayed image thereof onto the screen, characterized by the first objective system having a front focus greater than 6" and a focal length at least twice that of the second objective system, the work holder being transparent and horizontal, the viewing screen being above the work holder, the illuminating means being vertically above the work holder and above the screen, and there being plane reflecting means below the work holder for receiving light from the work piece and for directing it to the first objective system.

3. An optical system according to claim 2 in which the screen is vertical and behind the line of light from the illuminating means to the work holder and in which three additional reflecting surfaces angularly positioned on the projection axis in operative relationship are included between the first objective system which is horizontal, and the screen, for reflecting the light from the first objective system through the second objective system and to the screen.

ALLEN R. FULTZ.

REFERENCES CITED

The following references are of record in the file of this patent:

UNITED STATES PATENTS

| Number | Name | Date |
|---|---|---|
| 1,934,582 | Bausch et al. | Nov. 7, 1933 |
| 2,064,368 | Bausch et al. | Dec. 15, 1936 |
| 2,214,376 | Kurtz | Sept. 10, 1940 |
| 2,373,930 | Turrettini | Apr. 17, 1945 |
| 2,406,451 | Brokenstein | Aug. 27, 1946 |
| 2,414,867 | Gradisar et al. | Jan. 28, 1947 |